United States Patent [19]
Dorantes

[11] 3,994,461

[45] Nov. 30, 1976

[54] PEDESTAL TABLE WITH LOWER END RADIAL LEGS

[76] Inventor: Manuel Dorantes, Laureles No. 72, Jardines de Atizapan, Ciudad Lopez Mateos, Mexico

[22] Filed: Oct. 14, 1975

[21] Appl. No.: 621,969

[52] U.S. Cl. ............................ 248/188.7; 108/150; 403/217
[51] Int. Cl.² ........................................ F16M 11/20
[58] Field of Search ........... 248/188.1, 188.3, 188.7, 248/158; 108/150, 88; 403/217, 218, 219; 297/349, 354

[56] References Cited
UNITED STATES PATENTS

| | | | |
|---|---|---|---|
| 1,570,437 | 1/1926 | Dawson | 248/188.1 |
| 1,903,631 | 4/1933 | Morrison | 108/150 |
| 3,185,423 | 5/1965 | Jones | 108/150 |
| 3,380,696 | 4/1968 | Pauly et al. | 248/188.7 |
| 3,391,886 | 7/1968 | Schulz | 248/188.7 |
| 3,499,625 | 3/1970 | Froedge | 108/150 |
| 3,829,049 | 8/1974 | Hughes et al. | 248/188.7 |

FOREIGN PATENTS OR APPLICATIONS

| | | | |
|---|---|---|---|
| 489,633 | 1/1954 | Italy | 403/217 |

*Primary Examiner*—Robert A. Hafer
*Attorney, Agent, or Firm*—Clarence A. O'Brien; Harvey B. Jacobson

[57] ABSTRACT

A table including an upright tubular standard and having a horizontal tabletop supported from the upper end thereof is provided and at least three generally radially outwardly projecting legs are supported from the lower end of the upright. The legs comprise generally horizontally disposed elongated bars positioned in edge upstanding relation and the legs include inner end portions, outer end portions and intermediate portions. The legs are substantially equally spaced about the lower end of the standard and the lower end of the standard includes a plurality of equally peripherally spaced downwardly opening notches formed therein equal in number to the number of the legs. The intermediate portions of the legs are provided with upwardly opening notches whereby the notched intermediate leg portions and the notches in the lower end of the standard may be utilized to key the intermediate portions of the legs to the lower end of the standard. The inner ends of the legs include angulated inner end portions forming included angles equal to the angular displacement of the legs about the standard and the angulated terminal ends of the inner end portions of the legs overlap the non-angulated inner end portions of adjacent legs and are secured thereto by fasteners secured through the angulated terminal end portions and the non-angulated portions of the inner end portions of the legs. Also, the juncture portions of the inner end portions of the legs connecting the non-angulated inner end portions and the angulated terminal end portions are disposed in closely spaced relation about the center axis of the tubular standard defining an upstanding sleeve area through which the lower end of an upstanding tension member is secured, the upper end of the tension member being anchored relative to the tabletop structure supported from the upper end of the standard.

10 Claims, 6 Drawing Figures

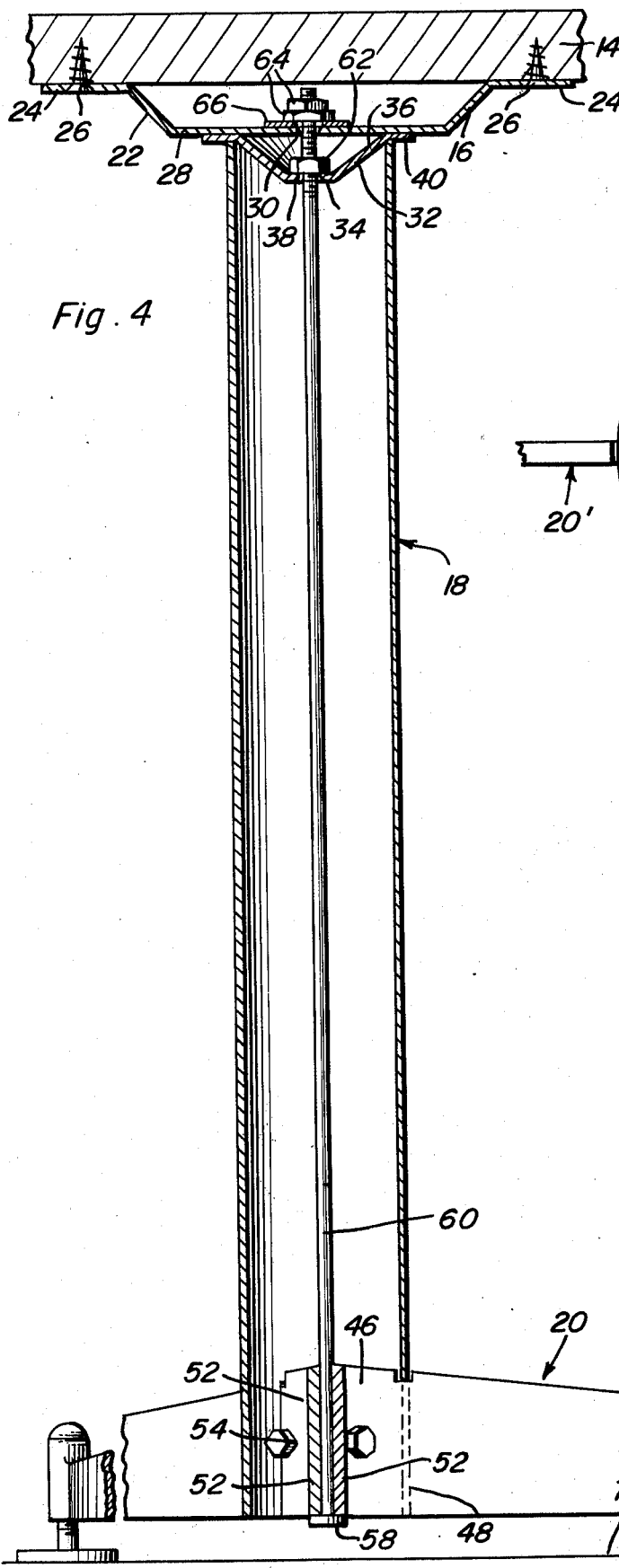

PEDESTAL TABLE WITH LOWER END RADIAL LEGS

BACKGROUND OF THE INVENTION

Various forms of pedestal tables which may be disassembled for compact storage and shipped in disassembled condition and yet which may be readily assembled have been heretofore designed.

However, these previously known tables are not readily constructed out of readily available and inexpensive materials and in a manner enabling the use of various identical components in the construction of the tables. Further, many different forms of pedestal tables which may be disassembled do not provide an extremely sturdy structure when fully assembled.

BRIEF DESCRIPTION OF THE INVENTION

The pedestal table of the instant invention utilizes, as its main components (exclusive of various hardware pieces) three or four identical legs and a single tubular center standard as well as any desired form of tabletop. Accordingly, the table may be readily mass produced at a minimum of cost for the basic table. However, the various structural features of the table enables certain portions thereof to be embellished as desired to provide not only a sturdy table but also a table which may blend with different decors.

The main object of this invention is to provide a pedestal table constructed in a manner whereby it may be readily shipped in a compact state and yet which will be capable of being readily assembled by the ultimate purchaser and user.

Another object of this invention is to provide a pedestal table in accordance with the preceding objects and which will define an extremely sturdy pedestal table structure when fully assembled.

Another important object of this invention is to provide a pedestal table including lower end generally radially outwardly projecting legs which may be identically constructed to further constitute a savings in cost.

Still another important object of this invention is to provide a pedestal table constructed in a manner whereby only two inexpensive components thereof need be changed in order to vary the height of the fully assembled table.

A final object of this invention to be specifically enumerated herein is to provide a pedestal table in accordance with the preceding objects and which will conform to conventional forms of manufacture, be of simple construction and easy to assemble so as to provide a device that will be economically feasible, long lasting and relatively trouble free in assembly.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged fragmentary vertical sectional view taken substantially upon the plane indicated by the section line 4—4 of FIG. 1;

FIG. 5 is a fragmentary horizontal sectional view similar to FIG. 2 but illustrating a slightly modified form of table; and FIG. 6 is a fragmentary perspective view of one of the legs of the modified form of table.

DETAILED DESCRIPTION OF THE INVENTION

Figure 1:
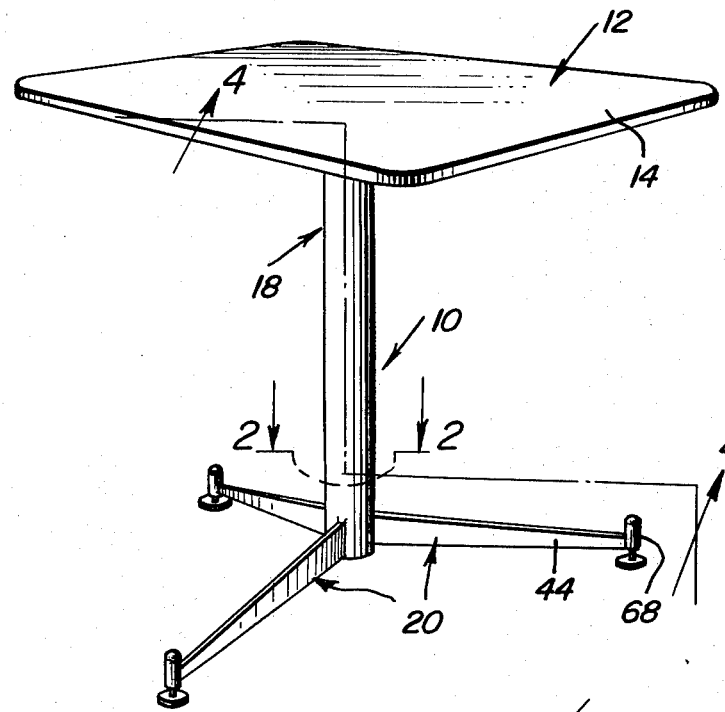
FIG. 1 is a perspective view of a first form of pedestal table constructed in accordance with the present invention.

Referring now more specifically to the drawings, the numeral 10 generally designates the pedestal table of the instant invention. The table 10 includes a tabletop assembly referred to in general by the reference numeral 12 including a top panel 14 and a mounting brace 16, a center tubular upright referred to in general by the reference numeral 18 and a plurality of lower end radially outwardly projecting legs referred to in general by the reference numerals 20.

The tabletop panel 14 may be of any suitable plan shape and may have a top surface thereof including any desired design. The bracket or brace 16 comprises a wide rigid strap member 22 which is generally horizontally disposed and includes upwardly offset opposite end portions 24 underlying and secured to the central area of the tabletop panel 14 by means of fasteners 26. The strap member bracket further includes a downwardly depressed central portion 28 centrally apertured as at 30 and having a dished washer 32 seated in its upper end portion. The washer 32 is centrally apertured as at 34 and includes an inverted truncated conical main portion 36, a horizontal lower wall 38 in which the aperture 34 is formed. In addition the washer 32 includes a horizontally disposed upper annular portion 40.

The upright 18 is tubular and includes an inside diameter substantially equal to the major diameter of the main portion 36 of the washer 32 whereby the latter may be seated in the upper end of the upright 18 with the flange 40 overlying the upper end of the upright 18.

The lower end of the upright 18 has three equally peripherally spaced downwardly opening longitudinally extending notches 42 formed therein and the legs 20 equal three in number and include outer end portions 44, inner end portions 46 and intermediate portions 48. The legs 20 each comprise elongated generally horizontally disposed edge upstanding bar members and the intermediate portions 48 of the legs 20 have upwardly opening notches 50 formed therein. Further, the inner end portions 46 of the legs 20 include angulated terminal ends 52 defining included angles with the remainders of the legs equal to the angular spacing between the outer end portions 44 of the legs 20. Accordingly, if three legs 44 are provided the included angles formed between each inner end portion 46 and the corresponding terminal end porton 52 is 120°.

Figure 3:
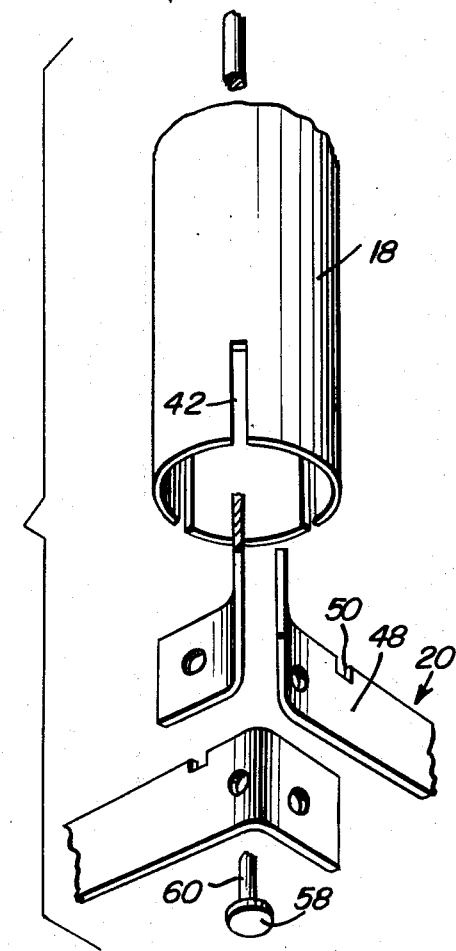
FIG. 3 is a fragmentary exploded perspective view of the structure by which the lower end radiating legs of the table are anchored to the lower end of the center tubular support of the table.
Figure 2:
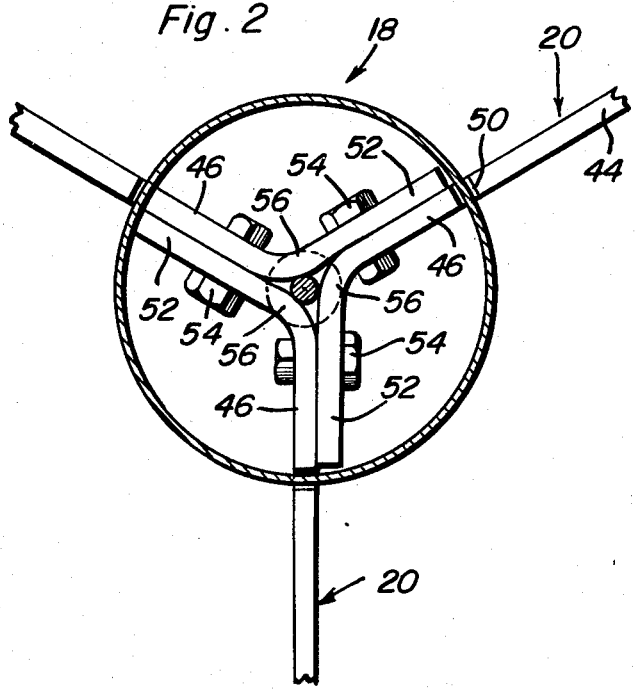
FIG. 2 is an enlarged fragmentary horizontal sectional view taken substantially upon the plane indicated by the section line 2—2 in FIG. 1.

The upwardly notched intermediate portions 48 of the legs 20 are removably interlockingly engaged with the downwardly notched portions 42 of the lower end of the upright 18 in a manner which is evident from FIGS. 2, 3 and 4 of the drawings. The angulated terminal end portions 52 overlap and are disposed in surface to surface contacting relation with the opposing side surface of the inner end portion 46 of an adjacent leg 20 and the overlapped portions 46 and 52 of each pair of adjacent legs are secured together by means of removable shank-type fasteners 54 secured therethrough. Further, the junctures 56 between the inner end portions 46 and the terminal end portions 52 are closely spaced apart about the longitudinal center axis of the upright 18 and define an upstanding center sleeve area within the upright 18 through which the headed lower end 58 of an upstanding tension rod 60 is secured. In addition, the upper end portion of the tension rod 60 is externally threaded and secured through the aperture 34 by means of a nut 62 and through the aperture 30 by means of a pair of nuts 64 and a washer 66 disposed between the lower nut 64 and the upper surface of the central apertured portion of the bracket 16. In this manner, the legs 20 are readily removably rigidly secured to the lower end of the upright 18.

The outer terminal ends of the outer end portions 44 of the legs 20 include upstanding internally threaded sleeve portions 68 which open downwardly and in which the upwardly projecting externally threaded shank portions 70 of foot members 72 are adjustably threadedly secured. Accordingly, the foot members 72 may be adjusted to compensate for unevenness of the surface 74 upon which the foot members 72 rest.

With attention now invited more specifically to FIGS. 5 and 6 of the drawings, there will be seen a modified form of table referred to in general by the reference numeral 10' and which includes a tubular upright 18' corresponding to the upright 18. In addition, four legs 20' corresponding to the legs 20 are provided.

From FIG. 6 of the drawings it may be seen that each of the legs 20' is provided with an upwardly opening notch 50' corresponding to the notches 50, but that the angulated inner termianl end portions 52' of the legs 20' form an included angle of approximately 90 degrees, there being four legs 20' provided. In addition, it is to be noted that the lower end of the tubular upright 18' is provided with four equally spaced downwardly opening notches (not shown) corresponding to the notches 42. Still further, a pair of fasteners 54' are used in each location of use of the fasteners 54.

Thus, it may be seen that the modified form of table 10' is constructed in substantially the same manner as the table 10, except that the table 10' is provided with four legs 20' instead of three legs 20 such as that provided on the table 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A standard and footed base construction including an upright tubular standard having at least three peripherally spaced upstanding slots formed in and opening downwardly through its lower end portion, a plurality of elongated longitudinal edge upstanding one-piece legs including inner end portions, outer end portions and intermediate portions disposed between said inner and outer end portions, said legs being arranged relative to said tubular standard with the free outer end portions thereof generally radiating outwardly of said standard, said intermediate portions snugly removably received through said slots and said inner end portions disposed inwardly of said slots including inner terminal ends spaced inwardly of said slots, horizontally angulated in the same direction about the center axis of said standard and lapped over the adjacent side of the inner end portion of the adjacent leg, in said direction, spaced outwardly of its angulated inner terminal end, and securing means releasably securing the angulated inner terminal end of each of said legs to the overlapped inner end portion of the next leg in said direction, whereby each leg is secured, by a single overlapped joint, to the angulated inner terminal end of an adjacent leg.

2. The combination of claim 1 wherein said securing means comprising fastening means rigidly securing said terminal ends to the overlapped sections of said adjacent legs.

3. The combination of claim 2 wherein said fastening means comprise shank type fasteners secured through said terminal ends and said overlapped sections.

4. The combination of claim 3 wherein said intermediate and inner end portions of each leg are identical to the intermediate and inner end portions of the other legs.

5. The combination of claim 3 wherein said legs, inwardly of said slots, are identical.

6. The combination of claim 3 wherein the junctures of said inner end portions and terminal ends are closely spaced apart about the central portion of said standard, and anchor means secured between said junctures and said standard, preventing downward displacement of said junctures relative to said standard.

7. The combination of claim 6 wherein said closely spaced apart junctures define an upstanding sleeve area therebetween, said anchor means comprising an upstanding tension member having its lower end portion secured through said sleeve area and its upper end portion anchored against downward displacement relative to said standard.

8. The combination of claim 1 wherein said standard comprises a central supportive upright for a table structure having a generally horizontal table top supported from the upper end portion of said standard.

9. The combination of claim 1 wherein said legs equal three in number and are generally equally spaced about said standard.

10. The combination of claim 1 wherein said legs equal four in number and are generally equally spaced apart about said standard.

* * * * *